B. J. GREELY.

Supporters for Stockings and Other Garments.

No. 8,472. Reissued Oct. 29, 1878.

Witnesses.

H. Wimmerwadel

L. F. Connor

Inventor.

Benjamin J. Greely by Crosby & Gregory

Attys

N. PETERS, PHOTO-LITHOGRAPHER, WASHINGTON, D. C.

UNITED STATES PATENT OFFICE.

BENJAMIN J. GREELY, OF BOSTON, MASSACHUSETTS.

IMPROVEMENT IN SUPPORTERS FOR STOCKINGS AND OTHER GARMENTS.

Specification forming part of Letters Patent No. 174,806, dated March 14, 1876; Reissue No. 8,472, dated October 29, 1878; application filed October 3, 1878.

*To all whom it may concern:*

Be it known that I, BENJAMIN J. GREELY, of Boston, in the county of Suffolk and State of Massachusetts, have invented an Improvement in Supporters for Stockings and other Garments, of which the following is a specification, taken in connection with the accompanying drawings.

Figure 1:
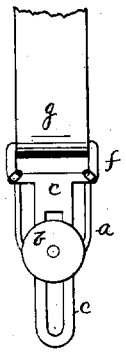
Figure 2:
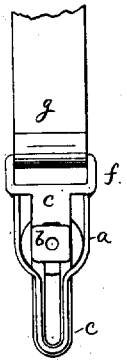
Figure 3:
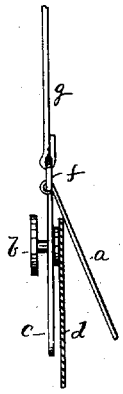
Figure 4:
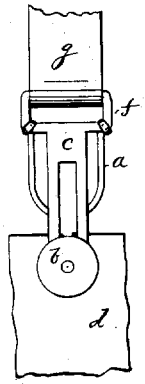
Figure 5:
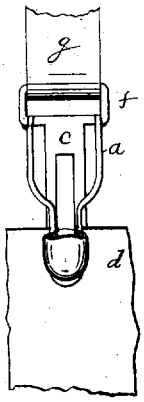

Figure 1 is a front elevation, Fig. 2 a rear elevation, Fig. 3 an edge view, and Figs. 4 and 5 front and rear elevations, of my improved clasp or device applied to a garment.

The device consists of two main parts, an eye, *a*, and a headed engaging device, *b*, the latter being mounted upon a part, *c*, which serves to connect or unite the parts *a* and *b*, to form a stocking or other garment-supporting attachment.

The garment *d*, to be grasped and held, is placed between the eye *a* on one side and an engaging device, *b*, on the other side, a portion of the engaging device, preferably headed like a button or stud, being placed in position opposite the open or wide portion of the eye near its upper end, (see Figs. 2 and 3,) where the opening in the eye is shown as of sufficient width to permit the end of the engaging device to itself press a portion of the garment *d* through the said eye, the portion or head of the engaging device following with the garment through the eye.

In such condition the headed engaging device, it being so supported as to be movable freely in a longitudinal direction with reference to the eye *a*, is moved from the larger open portion to the lower and narrower portion of the eye, as in Figs. 4 and 5, and the garment is securely held in place.

When the headed device, together with the garment *d*, is crowded down into the smaller and narrower lower end of the eye, it will be noticed that a portion of the garment *d* extends over the head of the device *b* between its under side and one face of the eye portion *a*, through the said eye portion, and then laterally about and across the other face of the said eye, and between the said last-mentioned face of the eye and the support *c*, with which the headed portion is connected. In this way the garment is held pressed against both faces of the material, forming the eye-piece *a*—viz., against one face by the under side of the head, and against the other face by the support for the headed device. The strap *g* is connected with the loop *f*.

It is obvious that the parts *a*, *b*, and *c* may be made in a variety of forms, all that is essential being that the parts *a* and *b* should be adapted to readily receive a portion of the garment *d* between them when in one position relatively to each other, as in Figs. 1, 2, and 3, and to hold such portion of the garment *d* securely when in a different position relatively to each other, as in Figs. 4 and 5, and that the part *c* should be adapted to connect together the parts *a* and *b* without preventing the proper motion of one in relation to the other.

I have made several different forms of this device; but that shown in the drawings I regard as the best form known to me.

The loop *f* serves simply to connect the device with the strap *g*. Any other suitable means may be substituted for it.

I claim—

1. A device to hold stockings or garments, it being composed of an eye and a headed longitudinally-movable engaging device adapted to press a portion of the garment to be held from one side of the eye through the eye, and thereafter be free to be moved, so as to follow along the said eye into its narrower portion, where the said eye and engaging device cooperate to hold the garment securely, substantially as described.

2. An eye shaped or fashioned to be connected with a strap combined with a headed engaging device made movable along the slot in the said eye, and a connection or support for the engaging device, the headed engaging device being adapted to press a portion of the garment against one face of the eye, and the support for the engaging device to press a portion of the garment against the opposite face of the eye, substantially as described.

3. In a garment-holder, a headed engaging device, extended from a support with which it is connected, combined with a metallic loop or wire adapted to embrace the shank of the engaging device between its head and the support for the engaging device, and hold a portion of the garment about the head and shank of the engaging device, substantially as described.

4. The combination of the parts *a*, *b*, *c*, and *f*, constructed and arranged to operate substantially as described.

BENJAMIN J. GREELY.

Witnesses:

G. W. GREGORY,

EUGENE GUYOT.